US010235715B2

United States Patent
Berlent et al.

(10) Patent No.: US 10,235,715 B2
(45) Date of Patent: *Mar. 19, 2019

(54) VISUALIZATION OF CHANGES THROUGH THE USE OF GRAPHICAL GEOMETRIC SHAPES

(71) Applicant: CFPH, LLC, New York, NY (US)

(72) Inventors: Todd Berlent, New York, NY (US); Jeffrey Stephens, Monroe, NJ (US); Luis Fernandez, Monroe, NJ (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,100

(22) Filed: Jul. 30, 2018

(65) Prior Publication Data

US 2018/0336633 A1    Nov. 22, 2018

Related U.S. Application Data

(63) Continuation of application No. 15/200,620, filed on Jul. 1, 2016, now Pat. No. 10,037,576.

(60) Provisional application No. 62/188,074, filed on Jul. 2, 2015.

(51) Int. Cl.
    *G06Q 40/04*    (2012.01)
(52) U.S. Cl.
    CPC .................................. *G06Q 40/04* (2013.01)
(58) Field of Classification Search
    None
    See application file for complete search history.

(56) References Cited

U.S. PATENT DOCUMENTS

| | | |
|---|---|---|
| D470,858 S | 2/2003 | Flamini |
| D683,356 S | 5/2013 | Hally |
| 8,661,465 B2 | 2/2014 | Gordon et al. |
| D710,377 S | 8/2014 | Rydenhag |
| D710,871 S | 8/2014 | McCormack et al. |
| D722,319 S | 2/2015 | Moore |
| D736,811 S | 8/2015 | Teichner |
| D752,076 S | 3/2016 | Guesnon, Jr. |
| D756,389 S | 5/2016 | Kwon et al. |
| 9,600,298 B2 | 3/2017 | Geva et al. |
| 9,612,720 B2 | 4/2017 | Le et al. |
| 9,615,065 B2 | 4/2017 | Frenette et al. |
| 9,632,692 B2 | 4/2017 | Puthenveettili |
| D813,270 S | 3/2018 | Stephens et al. |

(Continued)

FOREIGN PATENT DOCUMENTS

WO    WO 2006/126205    11/2006

OTHER PUBLICATIONS

Roberts, P. "Information Visualization for Stock Market Ticks: Toward a New Trading Interface"; Massachussetts Institute of Technology Sloan School of Management. Publication [online]. Feb. 2004 [retrieved Aug. 31, 2016]. Retrieved from the Internet: <https://dspace.mit.edu/bitstream/handle/1721.1/16668/56675083-MIT.pdf?sequence=2>; pp. 1-83.

(Continued)

*Primary Examiner* — Joseph W. King

(57) ABSTRACT

Methods and systems are disclosed for determining changes or revisions to a set of data and providing a user with a computerized graphical depiction of these changes through the use of multiple geometric shapes, the positioning of which shapes relative to one another and the size of which shapes relative to one another depict the changes to the user.

18 Claims, 8 Drawing Sheets

(56) References Cited

U.S. PATENT DOCUMENTS

| 10,037,579 | B2 | 7/2018 | Berlent et al. |
| 2004/0233201 | A1 | 11/2004 | Calkins et al. |
| 2006/0020538 | A1 | 1/2006 | Ran et al. |
| 2011/0225522 | A1 | 9/2011 | Kamiyama et al. |
| 2013/0268858 | A1 | 10/2013 | Kim et al. |
| 2015/0009219 | A1 | 1/2015 | Rubin et al. |
| 2015/0066980 | A1 | 3/2015 | Kim |
| 2015/0294409 | A1 | 10/2015 | Madhavan |
| 2017/0092062 | A1 | 3/2017 | Tsutsui |
| 2017/0102870 | A1 | 4/2017 | Won |

OTHER PUBLICATIONS

Notification of Transmittal of the International Search Report and the Written Opinion of the International Searching Authority for International Application No. PCT/US16/40734 dated Sep. 30, 2016, 7 pages.

| Pools | | | | | | | |
|---|---|---|---|---|---|---|---|
| Status Detail | PoolNumber | Factor | Original Face | Current Face | Terminator | EPN Message ID |
| ▲ Substituted | 706816 | 0.77275196 | 12,940,662.00 | 10,000,000.34 | 10 | 0529000000033 |
| Substituted | 739906 | 0.69431160 | 40,327,715.00 | 28,000,000.77 | 28 | 0529000000022 |
| Ready | AD5b68 | 0.92271848 | 15,172,553.00 | 13,999,999.66 | 14 | 0529000000033 |
| Substituted | 298197 | 0.71943183 | 18,069,815.00 | 12,999,999.71 | 13 | 0529000000033 |
| Substituted | 773692 | 0.50940767 | 9,815,356.00 | 4,999,999.95 | 5 | 0529000000023 |
| Ready | 762912 | 0.34917579 | 40,094,418.00 | 14,000,000.09 | 14 | 0529000000033 |

FIG. 6D

VISUALIZATION OF CHANGES THROUGH THE USE OF GRAPHICAL GEOMETRIC SHAPES

RELATED APPLICATIONS

This application is a continuation of U.S. patent application Ser. No. 15/200,620 filed Jul. 1, 2016 which claims the benefit of U.S. Provisional Application Ser. No. 62/188,074, filed Jul. 2, 2015, the contents of which are hereby incorporated by reference herein in their entirety.

BACKGROUND

Depicting numerical values in a table is known.

SUMMARY

According to an example embodiment, a method may comprise: receiving, via at least one processor, an indication that a lot is allocated to fulfill delivery of a transaction, wherein the lot is scheduled for delivery during a delivery window, wherein the lot comprises a pool, wherein the lot comprises a current face amount, and wherein the pool comprises an original and a current face amount; responsive to receiving the indication, displaying on a timeline, via the at least one processor on a display to a user, a first lot revision box that comprises a geometric shape that graphically depicts information about the lot that is scheduled for delivery and the pool, wherein the first lot revision box comprises a first pool box that represents and conveys information about the pool, wherein the first pool box comprises a geometric shape positioned within the first lot revision box, and wherein a size of the first pool box is proportional to the current face value of the pool relative to the current face value of the lot; receiving, via the at least one processor, an indication that a revision to the delivery of the lot has occurred; responsive to receiving the indication of the revision, displaying on the timeline, via the at least one processor on the display to the user, a second lot revision box proximate to the first lot revision box, wherein the second lot revision box comprises a geometric shape that graphically depicts the revision to the delivery of the lot, and wherein the second lot revision box comprises a second pool box that comprises a geometric shape positioned within the second lot revision box; and in connection with displaying the second lot revision box, making, via the at least one processor, a visual change to the first pool box, wherein the visual change reflects the revision.

According to another example embodiment, an apparatus may comprise: at least one a processor; and a non-transitory memory device in electronic communication with the at least one processor, in which the memory device stores instructions which, when executed by the at least one processor, direct the at least one processor to: receive an indication that a lot is allocated to fulfill delivery of a transaction, wherein the lot is scheduled for delivery during a delivery window, wherein the lot comprises a pool, wherein the lot comprises a current face amount, and wherein the pool comprises an original and a current face amount; responsive to receiving the indication, display, on a timeline on a display to a user, a first lot revision box that comprises a geometric shape that graphically depicts information about the lot that is scheduled for delivery and the pool, wherein the first lot revision box comprises a first pool box that represents and conveys information about the pool, wherein the first pool box comprises a geometric shape positioned within the first lot revision box, and wherein a size of the first pool box is proportional to the current face value of the pool relative to the current face value of the lot; receive an indication that a revision to the delivery of the lot has occurred; responsive to receiving the indication of the revision, display, on the timeline on the display to the user, a second lot revision box proximate to the first lot revision box, wherein the second lot revision box comprises a geometric shape that graphically depicts the revision to the delivery of the lot, and wherein the second lot revision box comprises a second pool box that comprises a geometric shape positioned within the second lot revision box; and in connection with displaying the second lot revision box, make a visual change to the first pool box, wherein the visual change reflects the revision.

The above advantages and features are of representative embodiments only, and are presented only to assist in understanding the invention. They are not to be considered limitations on the invention as defined by the claims. Additional features and advantages of embodiments of the invention will become apparent in the following description, from the drawings, and from the claims.

DESCRIPTION OF THE DRAWING

FIG. 2 illustrates a non-graphical representation of CC operations;

FIGS. 6A-6D illustrates various non-graphical representations of CC operations.

DETAILED DESCRIPTION

Figure 1:
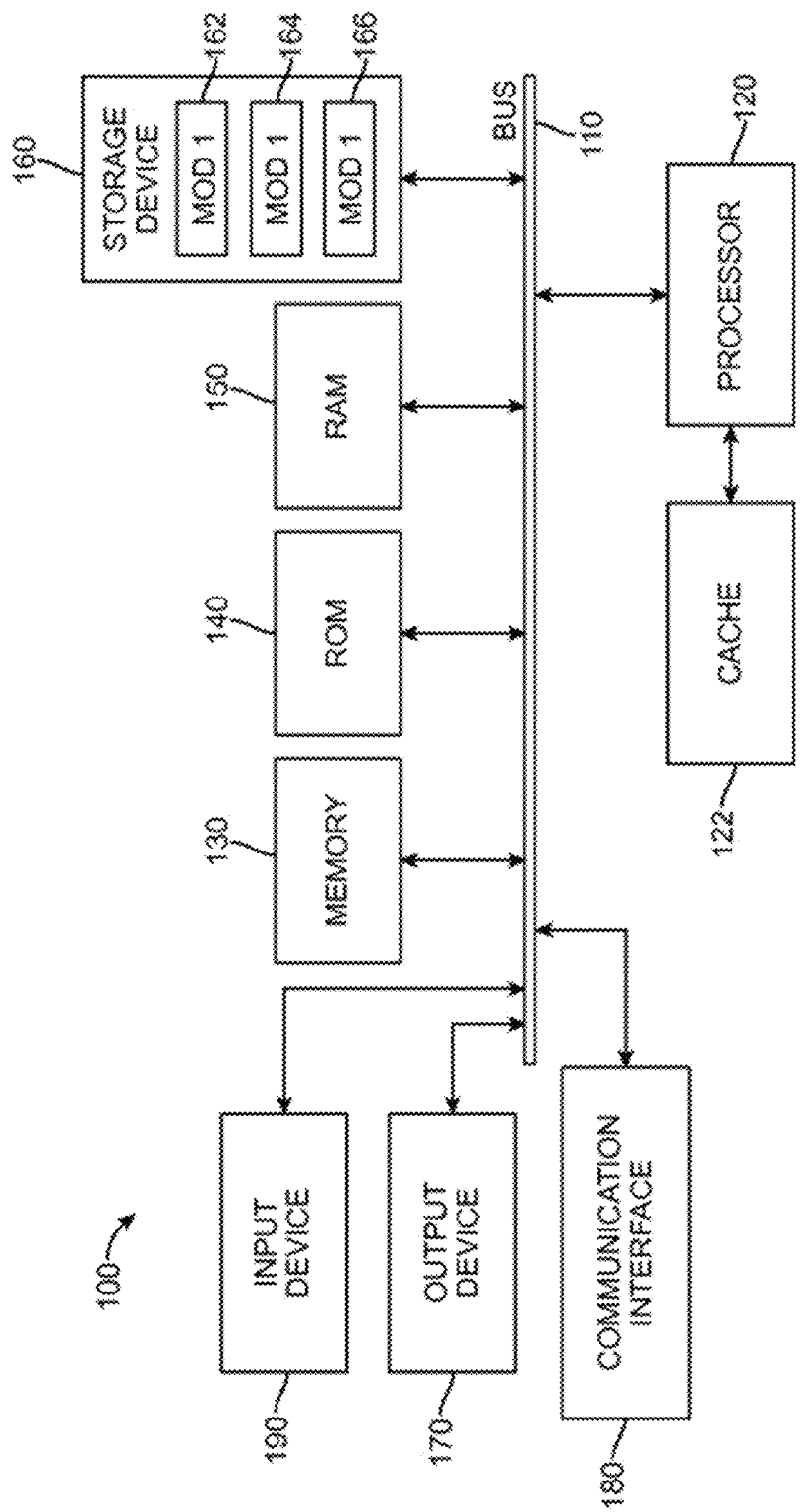
FIG. 1 illustrates an example system 100.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on an end-user's computer, partly on an end-user's computer, as a stand-alone software package, partly on an end-user's computer and partly on a remote computer or entirely on a remote computer or server as in a client/server relationship, such as cloud computing system, and/or web-based system, etc. In the latter scenario(s), a remote computer may be connected to an end-user's computer through any type of network (wired, optical, and/or wireless, etc.), including a local area network (LAN) or a wide area network (WAN), and/or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor(s) of a general purpose computer(s), special purpose computer(s), or other programmable data processing apparatus(s) to produce a machine, such that the instructions, which execute via the processor(s) of the computer(s) or other programmable data processing apparatus(s), create means for implementing the functions/acts specified in the flowchart and/or block diagram block or blocks.

These computer program instructions may also be stored in a computer readable medium that can direct a computer(s), other programmable data processing apparatus(s), or other devices to function in a particular manner, such that the instructions stored in the computer readable medium produce an article of manufacture including instructions which implement the function/act specified in the flowchart and/or block diagram block or blocks.

The computer program instructions may also be loaded onto a computer(s), other programmable data processing apparatus(s), or other devices to cause a series of operational steps to be performed on the computer(s), other programmable apparatus(s) or other devices to produce a computer-implemented process such that the instructions which execute on the computer(s) or other programmable apparatus(s) provide processes for implementing the functions/acts specified in the flowchart and/or block diagram block or blocks. As used herein, a "terminal" should be understood to be any one of a general purpose computer, as for example a personal computer or a laptop computer, a client computer configured for interaction with a server, a special purpose computer such as a server, or a smart phone, soft phone, tablet computer, personal digital assistant, wearable technology (such as VR headsets, smart watches, smart glasses, smart rings), or any other machine adapted for executing programmable instructions in accordance with the description thereof set forth above. The embodiments of the present invention may be facilitated by any one of the electronic devices described above.

A brief introductory description of a system or computing device in FIG. 1, which can be employed to practice the concepts, is disclosed herein. The variations shall be discussed herein as the various embodiments are set forth. The disclosure now turns to FIG. 1.

With reference to FIG. 1, an exemplary system or computing device 100 includes, for example, a processing unit (CPU or processor) 120 and a system bus 110 that couples various system components including, for example, the system memory 130 such as read only memory (ROM) 140 and random access memory (RAM) 150 to the processor 120. The computing device 100 can include a cache 122 of high speed memory connected directly with, in close proximity to, or integrated as part of the processor 120. The system may copy data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 may further include storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the computing device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interactions with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art, such as a display/screen(s), speaker(s), etc. In some instances, multi-modal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Computing device 100 may also include one or more network interface cards that allow device 100 to send/receive data over one more networks. Such network interface cards may allow computing device 100 to interface with other computing systems, servers, etc. similar to and/or different from device 100 including networked database systems.

Turning now to problems addressed by systems and methods disclosed herein, mortgage backed securities (MBS), for example, are traded in units called "Lots". A given lot may contain one or more "Pools". A given pool contains one or more specific mortgage backed securities. Delivery of a traded lot(s) from a seller to a buyer/recipient as part of a transaction between the parties is typically scheduled to occur within a delivery window subsequent to a trade (such as a 72 hour period, although the delivery window may consist of any length of time). Notably, when two entities trade, the actual pool(s) that will be subsequently delivered to the buying entity are not yet determined. Rather, during the delivery window one or more lots each having one or more specific pools owned by the selling entity and that are capable of fulfilling delivery of the traded lot(s) are identified/matched to the traded lot(s) and "allocated" to the trade. This allocation may be an automated process performed by a system (such as computing device 100) and/or may be a manual process performed by a user of such a system, or a combination thereof. Such a user may be referred to as an "allocator", for example. Notably, this allocation process is performed for numerous transactions.

An allocator may be one example person that may use tools described and disclosed herein.

Despite one or more lots of pools being allocated to fulfill the delivery of a trade, it is common during the delivery window for one or more revision operations, referred to as "cancel/correction" or "CC" operations, to be performed on allocated lot(s)/pool(s) to, for example, adjust pools and/or pool amounts that were allocated to the trade. For example, one or more pools may be substituted for an originally allocated pool (this may be referred to as "pool sub"). As another example, an original pool may remain matched with a traded lot, but the amount of current face value being delivered is changed. More so, allocated lot(s) of pools can be CC'ed multiple times before actual delivery and CC operations can affect more than one lot (for example, replacing a single 10 MM lot with ten 1 MM lots). These revisions again, may be an automated process and/or a process performed by an allocator that is triggered by some event, or some combination thereof. Allocators (and event recipients of delivered lots) need a way to view the various lot adjustments and revision history between all of the adjustments. Unfortunately, current MBS lot allocation representations produced by automated computing systems are confusing and fail to clearly convey the current and historical lot revisions due to CC operations. Current representations are difficult to read and are unable to effectively show the link when multiple lots are affected by a CC operation. Again, what makes the situation worse is that it's not merely one transaction that needs to be reviewed in a short duration of time but numerous transactions.

Figure 2:
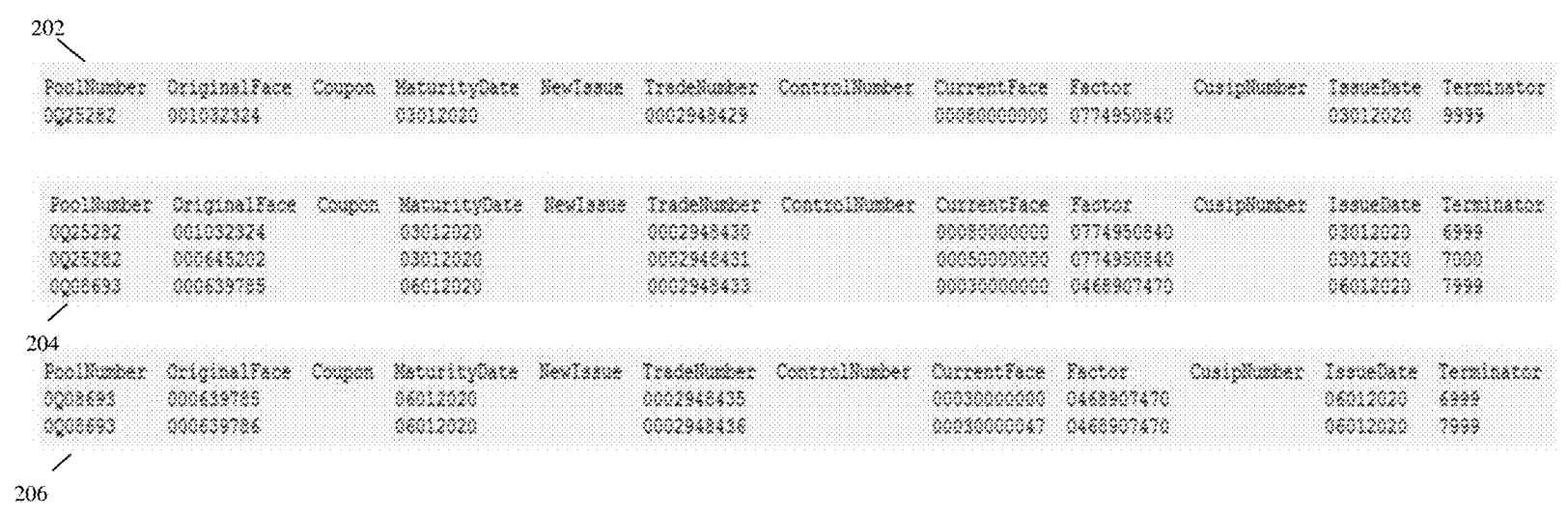

For example, turning to FIG. 2 there is illustrated an exemplary example of a current MBS lot allocation representation, which is a non-graphical representation that may be displayed by a computing device 100 to an allocator for showing the allocator various lot allocations. As shown in FIG. 2, the information regarding lot revisions and lot allocations are shown exclusively in text/tabular format, which can be difficult to understand and prone for misinterpretation and/or errors. Again, this non-graphical format becomes even more difficult to decipher when multiple lots are affected by a revision operation. It is desirable to have a graphical representation of this data that is able to quickly and efficiently illustrate to an allocator or other in possibly real-time the lot revision history. Such a graphical representation of the lot revision history also would generate a report that can be used for audit and regulatory purposes.

Figures 6A, 6B, 6C:
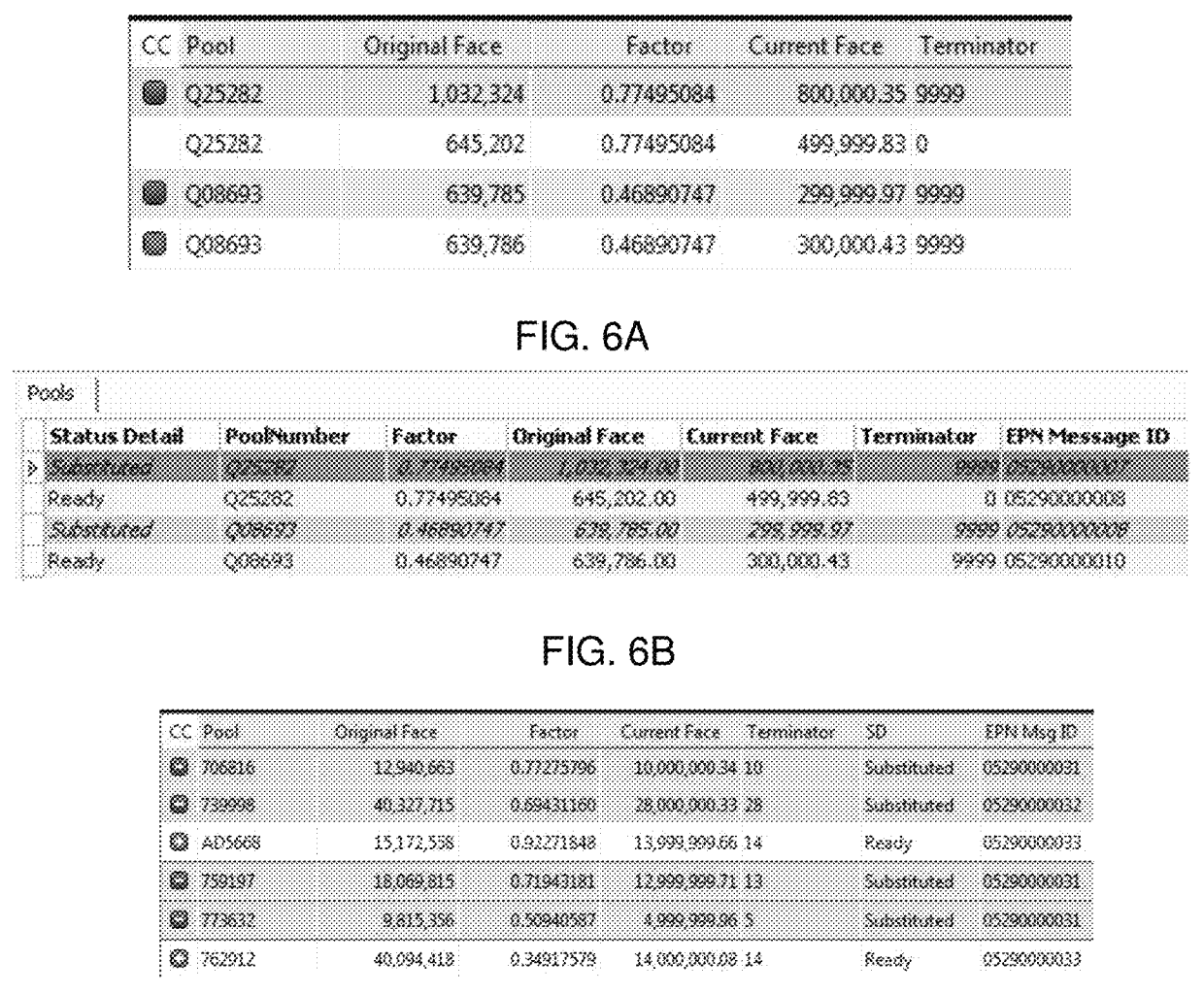

According to the example of FIG. 2, an allocator using a computing system such as computing device 100, for example, originally allocated a single lot with a single pool (here with pool number Q25282) to fulfill a given trade. This may be done, for example, by accessing a database of MBS pools owned by a selling entity, identifying one or more pools to satisfy the trade, and allocating the lots of pool(s) to the trade. Again, such a process may also be automated and performed automatically by device 100 for example, or some combination thereof. Thereafter, device 100 may display to the allocator the allocated pool. This is shown in section 202 of FIG. 2. Device 100 may access one or more local or external databases to provide all of the data shown in FIG. 2. Thereafter, a CC operation is performed that cancels the allocated pool and replaces it with 2 pools. Again, this may be a manual process or an automated process triggered by some event, or some combination thereof. The result is device 100 then displaying section 204 to the allocator, for example. Thereafter, another subsequent CC operation is performed that cancels one of the lot pools and replaces it with the same pool but with a different amount. The result is device 100 then displaying section 206 to the allocator. FIGS. 6A and 6B show other example tabular type outputs of the information of FIG. 2. that may be currently shown to an allocator. As another example to show the complication of allocation and lot revisions, three lots, each with a single pool, may be originally allocated for delivery to fulfill a trade. A CC operation may cancel the three lots and combine them into a new single lot. A subsequent CC operation may break the single lot into multiple lots. This revision history example is shown in the tabular views of FIGS. 6C and 6D.

As noted by FIG. 2 and FIG. 6, current MBS lot allocation representations are confusing, difficult to read, and fail to clearly convey the current and historical lot revisions due to CC operations. To be clear, the methods and systems disclosed herein are not directed at how to perform CC operations or pool/lot allocations. Rather, methods and systems discussed herein are directed at analyzing the data resulting from CC and allocation operations, for example, and providing computerized tools that improve on the way the data is presented to users as compared to merely tables of numbers. As further discussed below, methods and systems are disclosed for analyzing the data resulting from CC and allocation operations and providing a user(s) with a computerized graphical depiction of this data through the use of multiple geometric shapes, the positioning of which shapes relative to one another and the size of which shapes relative to one another depict changes to the user.

Figure 3:
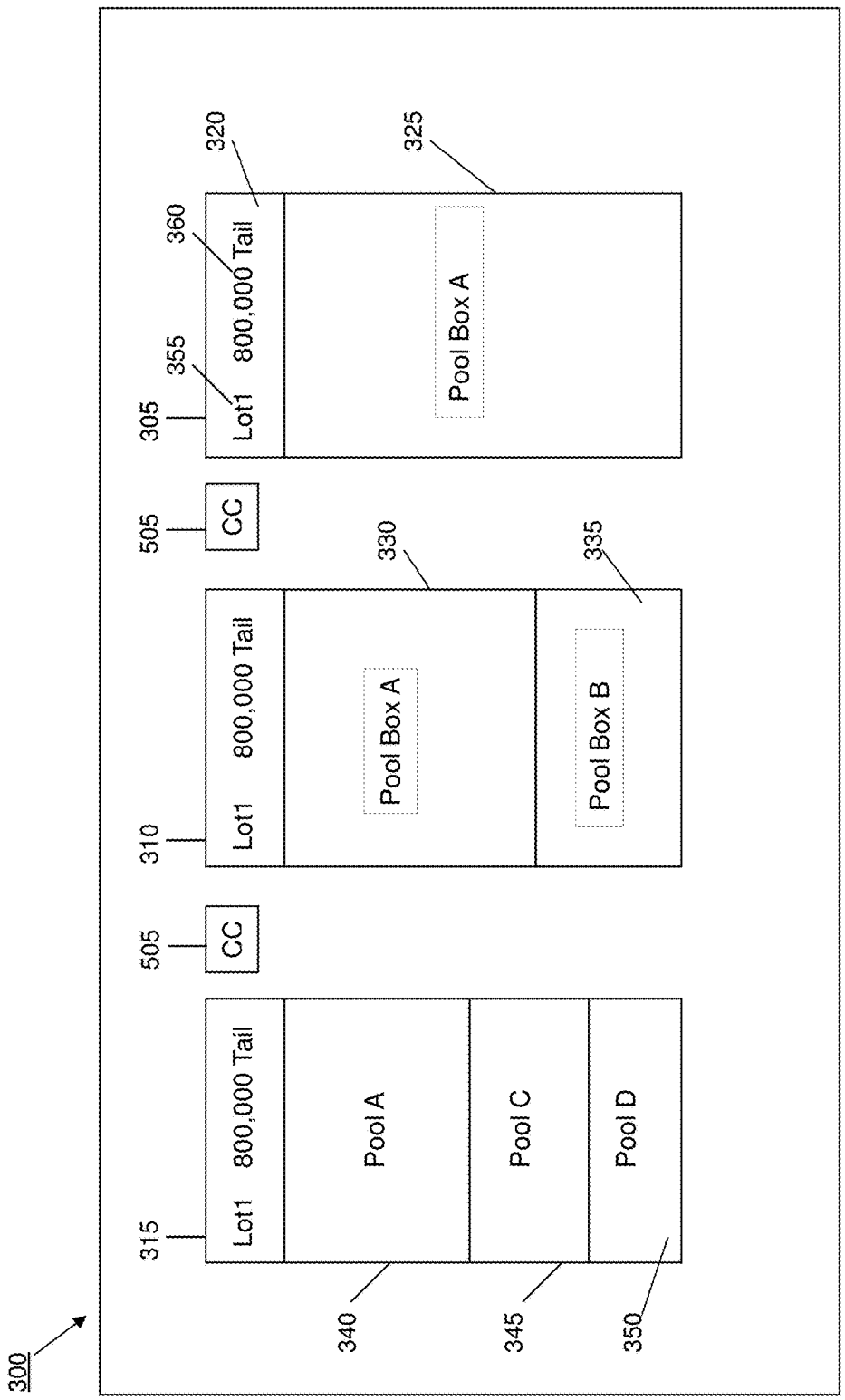
FIG. 3 illustrates an example lot revision view.

Referring now to FIG. 3 there is illustrated a graphical representation of lot revision view 300 according to an example embodiment. In one embodiment, lot revision view 300 allows a user/allocator to quickly and efficiently view the lot revision history for a lot(s) that is scheduled for delivery in the near future. In general, the graphical representation of FIG. 3 may be automatically produced by device 100 and displayed/updated to an allocator or other user subsequent to an original allocation and each revision. Alternatively, the allocator may need to prompt device 100 to produce and/or display such information, such as by the allocator requesting device 100 to generate the graphical depiction for a given trade indicated by the allocator. In addition to an allocator, device 100 may also produce and display the graphical representation of FIG. 3 for the recipient/buyer or other users for example. In addition, one will recognize that device 100 may display the graphical representation of FIG. 3 directly on output device 170, or cause the graphical representation of FIG. 3 to be displayed via a network on a remote device in use by a user. One will recognize that multiple users may view lot revision view 300 at the same time or substantially at the same time.

In the example illustrated in FIG. 3, a single lot with a single pool is originally allocated and scheduled to be delivered within a delivery window. Device 100 graphically depicts this to an allocator/user via lot revision box 305 (as indicated below, "box" is merely a term and element 305 need not be in the "shape" of a box). In this example, the lot comprises an original face value, which is a function of the pool(s) making up the lot and is the amount that was originally issued when the instruments making up the pool(s) were first created. The lot also comprises a current face value (which again is a function of the pool(s) making up the lot), which is a factor of the original face value and represents the amount that is to be delivered during the delivery period. In the exemplary example shown in FIG. 3, the original face value is 1,032,324 shares of mortgage backed securities. However, at the time of delivery, the current face value has decreased to a factor of 0.775 (or 77.5%) of the original face value. In the exemplary example illustrated in FIG. 3, the current face value is 800,000. There are a number of reasons for the difference between the original face value and the current face value. For example, the current face value may be taking into account the payments made by mortgage holders over a period of time before the delivery window. This information is further shown and discussed with reference to FIG. 4.

More specifically, an allocator may use device 100 to identify (or device 100 may automatically identify) one or more lots of pool(s) as being capable of fulfilling the delivery for a given trade. Device 100/allocator matches the available pools with the traded lot. These lot(s) of pool(s) make up the original allocation, which as noted above may then undergo a number of revisions (automatically or manually). Lot revision view 300 depicts this matched information between the counterparties and also any subsequent revisions through "lot revision boxes," which are shown in FIG. 3 as 305, 310 and 315. Each lot revision box represents a lot for delivery. Each lot revision box comprises header 320 and one or more "pool boxes," which are shown as 325, 330, 335, 340, 345 and 350 (as indicated below, "box" is merely a term and elements 325, 330, 335, 340, 345 and 350 need not be in the "shape" of a box). Each pool box of a lot revision box represents a pool that makes up the lot and is scheduled for delivery. Header 320 contains lot identifier 355 and lot amount 360. Lot identifier 355 is a notation for identifying a particular lot. In the instant example, lot identifier 355 is "Lot1." Lot amount 360 is the amount associated with the current face value of the lot, for example, and is a function of the pools that make up the lot as represented by the pool boxes within the lot revision box. In the other words, the current face value of the pools of a given lot revision box may sum up to the current face value of the lot.

Each pool box 325, 330, 335, 340, 345 and 350 is labeled with a specific pool number corresponding to an actual pool owned by an entity, and the height, size, area, and/or volume of each pool box is proportional to its weight within the lot (i.e., the amount the corresponding pool contributes proportionally to the lot amount 360—e.g., current face value of pool divided by current face value of the lot.). Referring back to FIG. 3, device 100/allocator initially/originally allocates/matches a single lot with a single pool to a trade for delivery. That lot/pool is shown in FIG. 3 as lot revision box 305 having pool 325 (which is identified as pool number A) which delivers the current face value amount of the lot.

However before delivery, a lot may undergo a number of revision operations before actual delivery of the current face value amount to the recipient as indicated above. Again, this revision operation is known as cancel or correction operations ("CC").

For example, as shown FIG. 3 and as indicated above, device 100, for example, originally allocates a single lot with a single pool to a trade for delivery, which is displayed to an allocator, for example, in lot revision view 300 as lot revision box 305 having pool box 325. At a later point in time, system 100 receives an indication of a change (e.g., automatically from an external source, from the allocator, etc.), in which the amount of the current face value being delivered by Pool A (as shown in pool box 325) is reduced. As a result, a CC operation occurs and a portion of the current face value of Lot 1 is determined to be delivered by an additionally matched pool (Pool B). This revision causes device 100 to update lot revision view 300 and now display lot revision box 310, having two pools—Pool A which is now reduced (represented by pool box 330) and Pool B (represented pool box 335). Note that pool box 330 is smaller in size than pool box 325, reflecting the change in the reduction in the current face value of Pool A. Note also that the size of pool box 330 is larger than the size of pool box 335, reflecting that Pool A is contributing more to the current face value of Lot 1 than Pool B.

In one embodiment, as the box 310 is displayed, a visual change occurs to pool box 325 for Pool A in the previous lot revision box 305 to indicate to the user that the pool changed from box 305 to 310. In the exemplary example, the visual change is a change in pattern (i.e. from solid to striped). However, any number of visual changes may occur, such as a change in color, texture, text font, etc. As one example, a solid pool box indicates the current pool and a patterned pool box indicates that the pool was cancelled or corrected.

Again, as shown by lot revision box 310 as compared to lot revision box 305, the height of pool box 330 as compared to pool box 325 is reduced to reflect the smaller amount being delivered by Pool A and thus the lesser contribution to the face value of the lot. Pool box 330 also is graphically depicted in a height that is proportional to its weight to the current face value amount being delivered. A user can quickly glance at lot revision box 310, and immediately discern that two different pools will be making the delivery and that Pool A will be delivering a significantly larger portion of the lot than Pool B. From a time perspective, as lot revision box 310 is displayed, it represents the current state of what is to be delivered, with lot revision box 305 now providing historical information to a user.

In another embodiment, the identity of the pool boxes making the delivery may change all together, so that one or more new replacement pools are substituted. FIG. 3 illustrates another revision occurring at a later point in time, which is depicted in lot revision box 315. Pool B (as shown in pool box 335) has been substituted with pool boxes 345 and 350, which correspond to actual Pools C and D. From a time perspective, as lot revision box 315 is displayed, it represents the current state of what is to be delivered, with lot revision boxes 310 and 305 now providing historical information to a user.

In another embodiment, lot revision view 300 illustrates a correction to an error, such as a misplaced comma, missing zero, an incorrectly inputted number or text.

Each time a revision occurs, such as a change or correction to the pool amount or pool identity (i.e., pool being replaced by another pool(s)), a new lot revision box appears in lot revision view 300 (automatically and/or in response to an action by a user). In some embodiments, the new lot revision box appears on the left of the former lot revision box along a horizontal axis (as shown in FIG. 3) (i.e., time moves from right to left). However, any number of configurations may be used for the placement of the lot revision boxes proximate to each other. In another example, time moves left to right. In another example, the lot revision boxes are displayed along a vertical axis (one on top of the other), with time progressing upwards or downwards. In another embodiment, the lot revision boxes are superimposed over each other. According to another example, for a given history that comprises numerous lot revision boxes, one or more lot revision boxes may not be displayed and rather, be replaced by an indicator, such as a series of " . . . " to indicate additional revisions are present but not displayed. An action by a user (mouse click, touch of the screen, etc.) may cause the history to be expanded/displayed to a user. Other examples are possible.

Referring back to FIG. 3, lot revision box 310 appears to the left of lot revision box 305, in response to a revision occurring. Similarly, another lot revision box 315 appears to the left of lot revision box 310 after another revision occurs. Each lot revision box 305, 310 and 315 may have a timestamp indicating the real-time occurrence of the revision. This time may be displayed in connection with each lot revision box (such as superimposed on the box, or next to the box such as under the box). As another example, a user may need to select a lot revision box (such as by clicking on, touching, hovering a mouse pointer over) to see the time. Other examples are possible. For example an actual time line may be displayed below the lot revision boxes for example, with the lot revision boxes position on the line with respect to one the revision occurred. Hence, lot revision boxes may not be evenly spaced.

In one embodiment and as indicated above, each lot history is represented by one or more lot revision boxes displayed in a horizontal row. The current revision is on the far left with prior revisions on the right ordered from the most recent to oldest. The far right revision is the original lot. Again, other variations are possible.

In one embodiment, each lot revision box 305/310/315 has a header 320 containing the lot identifier and amount (Tail, GDM, or Bid List). Below the header is the breakdown of the lot pool(s) by pool number using pool boxes that are within the lot revision box. Again, other variations are possible, such as the header being at the bottom of the box, left side of the box, right side of the box, etc.

One will also recognize that while lot revisions are shown in FIG. 3 as "boxes", lot revision boxes 305/301/315 may be any geometric shape, such as a circle, rectangle, square, triangle, etc., including 3-dimensional shapes. Again, according to such an example, each pool making up a lot may consume a proportional amount of the area/volume of the shape based on the amount of the pool to the total lot amount. As one example, lot revision box 315 may be a circle with each of Pools A, B, and C being shown as a proportional pie or wedge. According to another example, as the history of lot revision is displayed, different shapes may be used. For example, box 305 may be a first shape, box 310 may be a second different shape, box 315 may be a third yet different shape, or some combination/variation thereof. Similarly, while pools are shown in FIG. 3 as "boxes", pool boxes 325/330/335/340/345/350 may be any geometric shape, such as a circle, rectangle, square, triangle, etc., including 3-dimensional shapes. In addition, pool boxes may be different shapes from lot revision boxes. For example, a lot revision box may be shown as a box with the pools shown therein as a pie chart. Other examples are possible.

Figure 4:
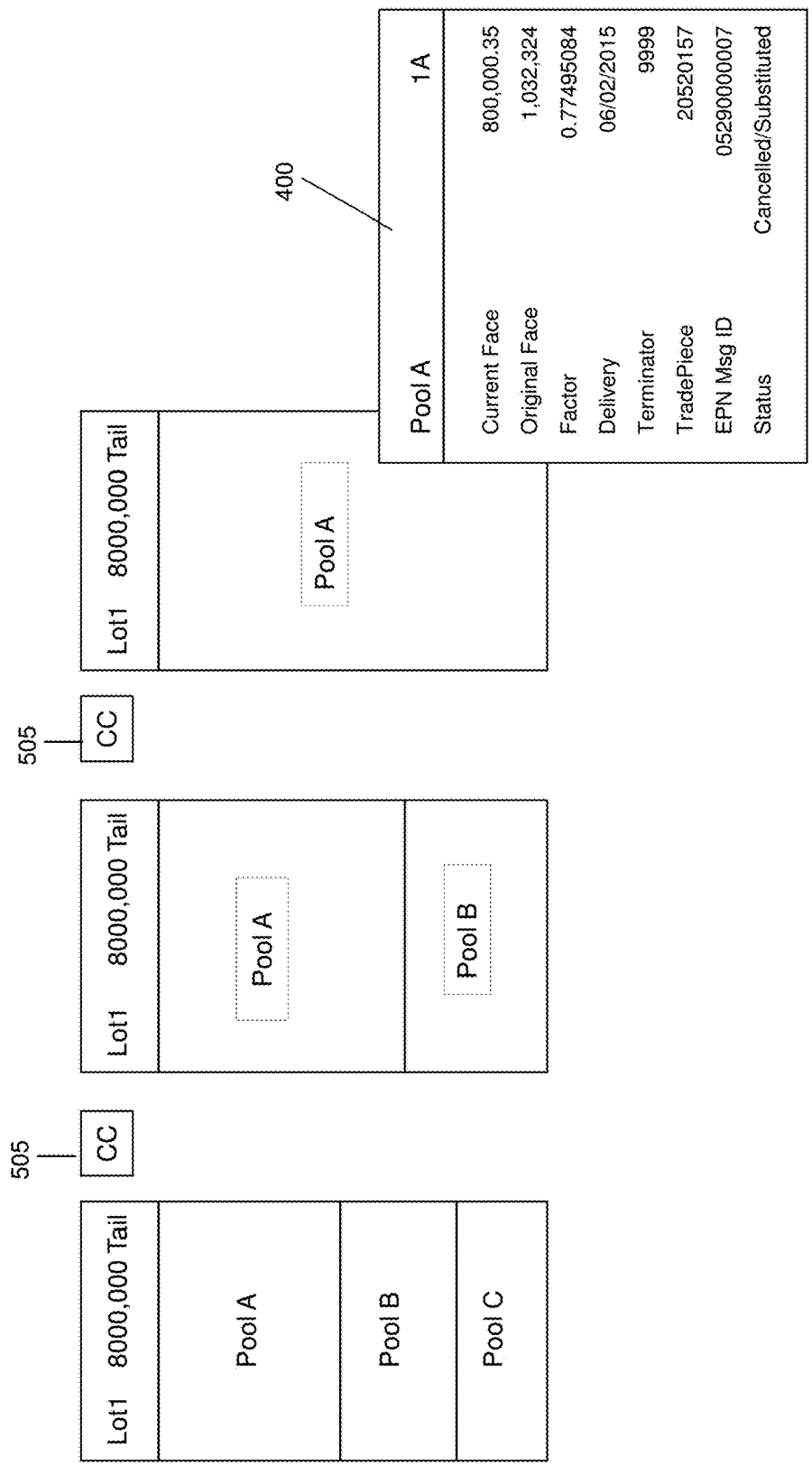
FIG. 4 illustrates an example pool box window in detail.

Turning to FIG. 4, it illustrates a window 400 that may appear when a user moves a cursor over (i.e., "mousing" over the pool box), clicks with a mouse, taps with a finger, visually or verbally selects, etc. a pool box, such as pool box 325. Window 400 may show additional pool information of the corresponding pool. In this way, information that was typically shown in tabular form of FIG. 2, for example, is hidden unless the user desires to see it, thereby reducing confusion.

Figure 5:
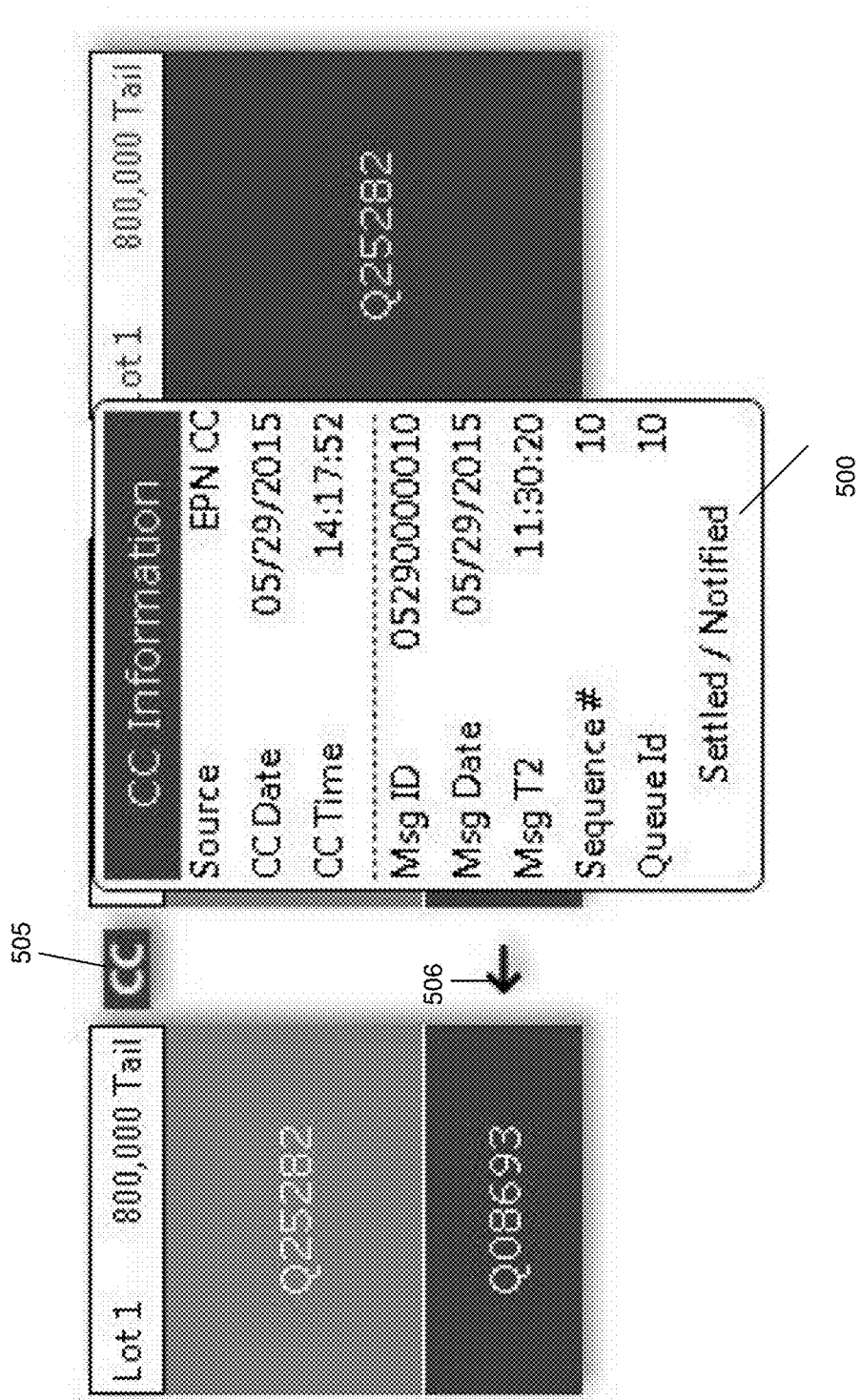
FIG. 5 illustrates an example graphical representation of a CC window in detail.

Turning to FIG. 5, it illustrates a window 500 that may appear when a user moves a cursor over one of CC buttons 505. In another embodiment, the windows appears after the user selects either the pool box or CC button, such as clicking with a mouse, tapping with a finger, visually or verbally selecting, etc. More specifically, between each lot revision box may be a CC box (although other shapes and/or indicators may be used), which indicates that the lot changed due to a CC operation. As shown in FIG. 5, in one embodiment, additional CC information (such as source EPN message ID, date, time) are displayed when "moused" over (e.g., hovering a mouse pointer over), for example. As also shown in FIG. 5, arrow(s) 506 may be present between each lot revision box and positioned vertically relative to a given pool to indicate that the pool was cancelled, replaced, or changed between revisions.

Figure 7:
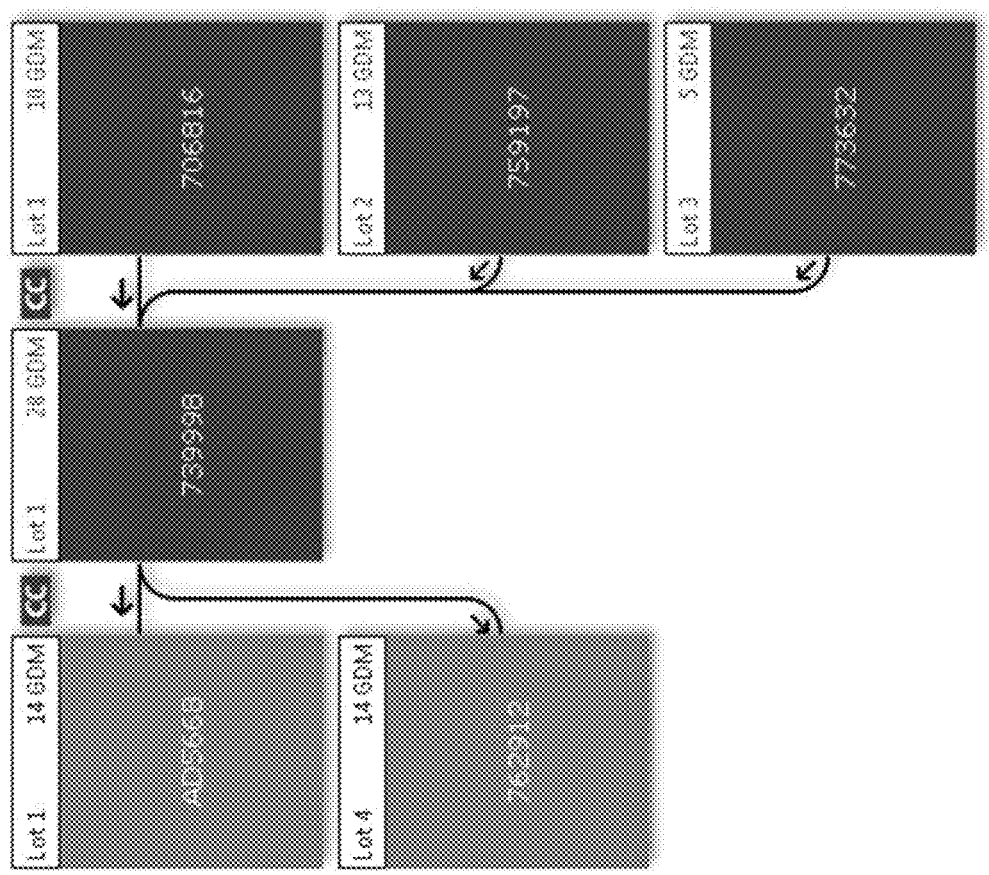
FIG. 7 illustrates an example lot revision view.

Referring to FIG. 7, it shows an example graphical representation of the revision shown in FIGS. 6C and 6D. Note that in FIG. 7, multiple lot revision boxes are stacked vertically to indicate that multiple lots of pools are scheduled to be delivered. In this example, first three lots are scheduled to be delivered, then one lot, and finally two lots, the changes due to CC operations. Again, the example of FIG. 7 may be displayed in other ways, such as with time going vertically. Here, rather than multiple lots being stacked at a given time, they may be displayed horizontally. Other examples are possible.

One will recognize that while the examples discussed herein are described with respect to MBS, the method and systems are also applicable to other instruments including, but are not limited to syndicated loans, and other items including instruments that could belong to baskets, indices, or exchange-traded-funds, or are eligible for repo borrowing/lending.

Exemplary Embodiments

A. A method comprising: receiving, via a processor, an indication that a lot is scheduled for a delivery during a delivery window, in which the lot comprises a current face amount that is a factor of an original face amount; selecting, via a processor, at least one pool that to fulfill the delivery amount of the lot; displaying on a timeline, via the processor on a display, a first lot revision box that graphically depicts information about the lot that is scheduled for delivery and the at least one pool; receiving, via a processor from a remote device, an indication that a revision to the delivery of the lot has occurred, in which the processor and the remote device are in electronic communication over a network; displaying on the timeline, via the processor on the display, a second lot revision box proximate to the first lot revision box, in which the second lot revision box graphically depicts the revision to the delivery of the lot; causing, via a processor, a visual change to the first lot revision box, and in which the visual change occurs in real-time.

A.0. The method of claim A further comprising: transmitting a notification that the first lot revision box has been revised. A.1. The method of claim A further comprising: marking each of the first lot revision box and the second revision box with a timestamp.

A.2. The method of claim A, in which the revision comprises a substitution of the at least one pool. A.3. The method of claim A, in which the revision changes a percentage of the current face amount that is being delivered by the at least one pool. A.3.1. The method of claim A.3. further comprising: in response to changing the percentage of the current face amount that is being delivered, adjusting a height of the at least one pool box, in which the height is proportional to a weight of the at least one pool within the lot. A.4. The method of claim A, in which the revision changes a quantity of the current face amount that is being delivered by the at least one pool. A.4.1. The method of claim A.3. further comprising: in response to changing the quantity of the current face amount that is being delivered, adjusting a height of the at least one pool, in which the height that is proportional to a weight of the at least one pool within the lot. A.5. The method of claim A, in which the revision comprises splitting the current face amount that is being delivered between the at least one pool and another pool. A.6. The method of claim A, in which the revision comprises correcting an error.

A.7. The method of claim A, in which the lot revision box comprises a header, in which the header comprises a lot identifier and a lot amount. A.7.1. The method of claim A.7., in which the lot amount is a current face value.

A.8. The method of claim A, in which the lot is a mortgage lot consisting of at least one mortgage pool. A.9. The method of claim A, in which the lot comprises a syndicated loan.

A.10. The method of claim A, in which the lot comprises an instrument for loaning to at least one of a basket, an index and exchanged-traded-fund. A.11. The method of claim A, in which the at least one pool is grouped with other pools into the lot.

A.12. The method of claim A, in which causing the visual change to the first lot revision box further comprising: causing a visual change to the at least one pool box. A.13. The method of claim A, in which the visual change comprises a change in a color. A.14. The method of claim A, in which the visual change comprises a change in a gradient. A.15. The method of claim A, in which the visual change comprises a change in a text. A.16. The method of claim A, in which the visual change comprises a change in a texture. A.17. The method of claim A, in which the visual change comprises a change in a pattern. A.18. The method of claim A, in which the at least one pool box comprises a height that is proportional to a weight within the lot.

A.19. The method of claim A further comprising: receiving an indication that a second revision to the delivery of the lot has occurred; displaying, on the display, a third lot revision box proximate to the second lot revision box, in which the third lot revision box graphically depicts the revision to the delivery of the lot and in which the third lot revision box appears on the timeline; and causing a visual change to the second lot revision box, and in which the visual change occurs in real-time. A.20. The method of claim A, in which the timeline displays each lot revision box in chronological order based on the timestamp. A.21. The method of claim A, in which each lot revision box is displayed along a horizontal axis. A.21.1. The method of claim A.21, in which a most recent lot revision box appears most left of the timeline.

B. An apparatus comprising: a processor; and a memory, in which the memory stores instructions which, when executed by the processor, direct the processor to: receive an indication that a lot is scheduled for a delivery during a delivery window, in which the lot comprises a current face amount that is a factor of an original face amount; select at least one pool that to fulfill the delivery amount of the lot; display on a display, a first lot revision box that graphically depicts information about the lot that is scheduled for delivery and the at least one pool, in which the first lot revision box appears on a timeline; receive an indication that a revision to the delivery of the lot has occurred; display, on the display, a second lot revision box proximate to the first lot revision box, in which the second lot revision box graphically depicts the revision to the delivery of the lot and in which the second lot revision box appears on the timeline; cause a visual change to the first lot revision box, and in which the visual change occurs in real-time.

B.0. The apparatus of claim B, in which the memory further stores instructions which, when executed by the processor, direct the processor to: transmit a notification that the first lot revision box has been revised. B.1. The apparatus of claim B, in which the memory further stores instructions which, when executed by the processor, direct the processor to: mark each of the first lot revision box and the second revision box with a timestamp.

B.2. The apparatus of claim B, in which the revision comprises a substitution of the at least one pool. B.3. The apparatus of claim B, in which the revision changes a percentage of the current face amount that is being delivered by the at least one pool. B.3.1. The apparatus of claim B.3., in which the memory further stores instructions which, when executed by the processor, direct the processor to: in response to changing the percentage of the current face amount that is being delivered, adjust a height of the at least one pool box, in which the height is proportional to a weight of the at least one pool within the lot. B.4. The apparatus of claim B, in which the revision changes a quantity of the current face amount that is being delivered by the at least one pool. B.4.1. The apparatus of claim B.3., in which the memory further stores instructions which, when executed by the processor, direct the processor to: in response to changing the quantity of the current face amount that is being delivered, adjust a height of the at least one pool, in which the height that is proportional to a weight of the at least one pool within the lot.

B.5. The apparatus of claim B, in which the revision comprises splitting the current face amount that is being delivered between the at least one pool and another pool. B.6. The apparatus of claim B, in which the revision comprises correcting an error.

B.7. The apparatus of claim B, in which the lot revision box comprises a header, in which the header comprises a lot identifier and a lot amount. B.7.1. The apparatus of claim B.7., in which the lot amount is a current face value.

B.8. The apparatus of claim B, in which the lot is a mortgage lot consisting of at least one mortgage pool. B.9. The apparatus of claim B, in which the lot comprises a syndicated loan.

B.10. The apparatus of claim B, in which the lot comprises an instrument for loaning to at least one of a basket, an index and exchanged-traded-fund. B.11. The apparatus of claim B, in which the at least one pool is grouped with other pools into the lot.

B.12. The apparatus of claim B, in which the memory further stores instructions which, when executed by the processor, direct the processor to: cause a visual change to the at least one pool box. B.13. The apparatus of claim B, in which the visual change comprises a change in a color. B.14. The apparatus of claim B, in which the visual change comprises a change in a gradient. B.15. The apparatus of claim B, in which the visual change comprises a change in a text. B.16. The apparatus of claim B, in which the visual change comprises a change in a texture. B.17. The apparatus of claim B, in which the visual change comprises a change in a pattern. B.18. The apparatus of claim B, in which the at least one pool box comprises a height that is proportional to a weight within the lot.

B.19. The apparatus of claim B, in which the memory further stores instructions which, when executed by the processor, direct the processor to: receive an indication that a second revision to the delivery of the lot has occurred; display, on the display, a third lot revision box proximate to the second lot revision box, in which the third lot revision box graphically depicts the revision to the delivery of the lot and in which the third lot revision box appears on the timeline; and cause a visual change to the second lot revision box, and in which the visual change occurs in real-time.

B.20. The apparatus of claim B, in which the timeline displays each lot revision box in chronological order based on the timestamp. B.21. The apparatus of claim B, in which each lot revision box is displayed along a horizontal axis. B.21.1. The apparatus of claim B.21, in which a most recent lot revision box appears most left of the timeline.

C. An article of manufacture comprising: a computer-readable medium that is non-transitory, in which the computer-readable medium stores instructions which, when executed by a processor, direct the processor to: receive an indication that a lot is scheduled for a delivery during a delivery window, in which the lot comprises a current face amount that is a factor of an original face amount; select at least one pool that to fulfill the delivery amount of the lot; display on a display, a first lot revision box that graphically depicts information about the lot that is scheduled for delivery and the at least one pool, in which the first lot revision box appears on a timeline; receive an indication that a revision to the delivery of the lot has occurred; display, on the display, a second lot revision box proximate to the first lot revision box, in which the second lot revision box graphically depicts the revision to the delivery of the lot and in which the second lot revision box appears on the timeline; cause a visual change to the first lot revision box, and in which the visual change occurs in real-time.

C.0. The article of manufacture of claim C, in which the computer-readable medium further stores instructions which, when executed by the processor, direct the processor to: transmit a notification that the first lot revision box has been revised. C.1. The article of manufacture of claim C, in which the computer-readable medium further stores instructions which, when executed by the processor, direct the processor to: mark each of the first lot revision box and the second revision box with a timestamp.

C.2. The article of manufacture of claim C, in which the revision comprises a substitution of the at least one pool. C.3. The article of manufacture of claim C, in which the revision changes a percentage of the current face amount that is being delivered by the at least one pool. C.3.1. The article of manufacture of claim C.3., in which the computer-readable medium further stores instructions which, when executed by the processor, direct the processor to: in response to changing the percentage of the current face amount that is being delivered, adjust a height of the at least one pool box, in which the height is proportional to a weight of the at least one pool within the lot. C.4. The article of manufacture of claim C, in which the revision changes a quantity of the current face amount that is being delivered by the at least one pool. C.4.1. The article of manufacture of claim C.3., in which the computer-readable medium further stores instructions which, when executed by the processor, direct the processor to: in response to changing the quantity of the current face amount that is being delivered, adjust a height of the at least one pool, in which the height that is proportional to a weight of the at least one pool within the lot.

C.5. The article of manufacture of claim C, in which the revision comprises splitting the current face amount that is being delivered between the at least one pool and another pool. C.6. The article of manufacture of claim C, in which the revision comprises correcting an error.

C.7. The article of manufacture of claim C, in which the lot revision box comprises a header, in which the header comprises a lot identifier and a lot amount. C.7.1. The article of manufacture of claim C.7., in which the lot amount is a current face value.

C.8. The article of manufacture of claim C, in which the lot is a mortgage lot consisting of at least one mortgage pool. C.9. The article of manufacture of claim C, in which the lot comprises a syndicated loan.

C.10. The article of manufacture of claim C, in which the lot comprises an instrument for loaning to at least one of a basket, an index and exchanged-traded-fund. C.11. The article of manufacture of claim C, in which the at least one pool is grouped with other pools into the lot.

C.12. The article of manufacture of claim C, in which the computer-readable medium further stores instructions which, when executed by the processor, direct the processor to: cause a visual change to the at least one pool box. C.13. The article of manufacture of claim C, in which the visual change comprises a change in a color. C.14. The article of manufacture of claim C, in which the visual change comprises a change in a gradient. C.15. The article of manufacture of claim C, in which the visual change comprises a change in a text. C.16. The article of manufacture of claim C, in which the visual change comprises a change in a texture. C.17. The article of manufacture of claim C, in which the visual change comprises a change in a pattern. C.18. The article of manufacture of claim C, in which the at least one pool box comprises a height that is proportional to a weight within the lot.

C.19. The article of manufacture of claim C, in which the computer-readable medium further stores instructions which, when executed by the processor, direct the processor to: receive an indication that a second revision to the delivery of the lot has occurred; display, on the display, a third lot revision box proximate to the second lot revision box, in which the third lot revision box graphically depicts the revision to the delivery of the lot and in which the third lot revision box appears on the timeline; and cause a visual change to the second lot revision box, and in which the visual change occurs in real-time. C.20. The article of manufacture of claim C, in which the timeline displays each lot revision box in chronological order based on the timestamp. C.21. The article of manufacture of claim C, in which each lot revision box is displayed along a horizontal axis. C.21.1. The article of manufacture of claim C.21, in which a most recent lot revision box appears most left of the timeline.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A method comprising:
receiving, via at least one processor, an indication that a lot of securities is allocated to fulfill delivery of a transaction, wherein the lot of the securities is scheduled for delivery, wherein the lot comprises at least a first pool of the securities and a current face value;
responsive to receiving the indication, displaying on a graphical user interface (GUI) of a user device, via the at least one processor, a first lot revision box that comprises a geometric shape that graphically depicts information about the lot that is scheduled for delivery and the first pool, and a header comprising a face value for the lot, wherein the first lot revision box comprises a first pool box that conveys information about the first pool, and wherein a size of the first pool box is proportional to the current face value of the first pool relative to the current face value of the lot;

receiving, via the at least one processor, an indication that a revision to the lot allocated for delivery has occurred;

responsive to receiving the indication of the revision, displaying, via the at least one processor, on the GUI, a second lot revision box proximate to the displayed first lot revision box, wherein the displayed second lot revision box depicts the revision to the lot allocated for delivery, wherein the second lot revision box comprises a revised first pool box having a reduced size of the geometric shape of the first pool box which reduced size is proportional to a revised and reduced current face value of the first pool, and the second lot revision box further comprises a second pool box which has a size proportional to a current face value of a second pool of the lot, and wherein the current face value of the second pool is equal to an amount of the reduction of the current face value of the first pool.

2. The method of claim 1, further comprising: transmitting via a network to a device in use by another user for display on the device the second lot revision box and the first lot revision box and the second lot revision box comprising the visual change to the first pool box.

3. The method of claim 1, wherein prior to the revision, the lot comprises the first pool and a second pool different from the first pool, the second pool having a current face value, wherein the first lot revision box comprises a third pool box that represents and conveys information about the second pool, wherein the third pool box comprises a geometric shape positioned within the first lot revision box proximate to the first pool box, and wherein a size of the third pool box is proportional to the current face value of the third pool relative to the current face value of the lot.

4. The method of claim 3, further comprising: receiving an indication that the user selected the first pool box, wherein receiving the indication is a result of the user performing on the GUI at least one of: clicking on the first pool box with a mouse, hovering a mouse pointer over the first pool box, and touching the first pool box; and responsive to receiving the indication, displaying on the GU1 a graphical text box that displays to the user information about the first pool.

5. The method of claim 1, wherein the second lot revision box comprises a third pool box that represents a second pool different from the first pool and that makes up the lot, wherein the second pool has a current face value, and wherein the third pool box comprises a geometric shape positioned within the second lot revision box proximate the second pool box and has a size that is proportional to the current face value of the third pool relative to the current face value of the lot.

6. The method of claim 5, wherein the first lot revision box also comprises a pool box that represents the second pool.

7. The method of claim 5, wherein the revision adds the second pool to the lot, and wherein the first lot revision box does not include a pool box that represents the second pool.

8. The method of claim 5, further comprising: in connection with the displaying of the second lot revision box, displaying on the GUI an arrow between the first lot revision box and the second lot revision box, wherein the arrow is positioned proximate to the first pool box and the second pool box.

9. The method of claim 1, wherein the revision comprises a substitution of the first pool with a second pool and a third pool that are different from the first pool, wherein the second and third pools each has a respective current face value, wherein the second pool box represents the second pool, wherein the second lot revision box further comprises a third pool box that comprises a geometric shape positioned within the second lot revision box proximate to the second pool box and that represents the third pool, wherein a size of the second pool box is proportional to the current face value of the second pool relative to the current face value of the lot; wherein a size of the third pool box is proportional to the current face value of the third pool relative to the current face value of the lot; and wherein the size of the second pool box plus the size of the third pool box are the same size as the first pool box.

10. The method of claim 1, wherein the lot comprises a mortgage securities lot comprising at least one mortgage securities pool.

11. The method of claim 1, wherein the revision includes a visual change to the lot on the GUI which comprises at least one of: a change in a color, a change in a gradient, a change in a text, a change in a texture, a change in geometric shape, and a change in a pattern.

12. The method of claim 1, wherein the first and second lot revision boxes are displayed side by side along a horizontal axis time line or aligned vertically next to each other along a vertical axis time line.

13. The method of claim 11, wherein the revision comprises a first revision; and wherein (New) The method further comprises: receiving an indication that a second revision to the delivery of the lot has occurred, the second revision being subsequent to the first revision; responsive to receiving the indication of the second revision, displaying on the GUI a third lot revision box proximate to the second lot revision box, wherein the third lot revision box comprises a geometric shape that graphically depicts the second revision to the delivery of the lot, and wherein the third lot revision box comprises a third pool box that comprises a geometric shape positioned within the third lot revision box; and in connection with the displaying of the third lot revision box, making a visual change to the second lot revision box pool box that reflects the second revision.

14. The method of claim 13, wherein the second lot revision box is displayed next to and to the left of the first lot revision box, and wherein the third lot revision box is displayed next to and to the left of the second lot revision box.

15. The method of claim 14, further comprising: responsive to receiving the indication of the second revision, displaying on the GUI a fourth lot revision box below the third lot revision box, wherein the fourth lot revision box comprises a geometric shape for at least one pool box displayed within the fourth lot revision box that graphically depicts the second revision to the delivery of the lot, and wherein the fourth lot revision box comprises a fourth pool box that comprises a geometric shape positioned within the fourth lot revision box.

16. An apparatus comprising: at least one a processor; and a non-transitory memory device in electronic communication with the at least one processor, in which the memory device stores instructions which, when executed by the at least one processor, direct the at least one processor to:

receive an indication that a lot of securities is allocated to fulfill delivery of a transaction, wherein the lot of the securities is scheduled for, wherein the lot comprises at least a first pool of the securities and a current face value;

responsive to receiving the indication, display on a graphical user interface (GUI) of a user device, a first lot revision box that comprises a geometric shape that graphically depicts information about the lot that is scheduled for delivery and the first pool, wherein the first lot revision box comprises a first pool box that conveys information about the first pool, and wherein a size of the first pool box is proportional to the current face value of the first pool relative to the current face value of the lot;

receive an indication that a revision to the lot allocated for delivery has occurred;

responsive to responsive to receiving the indication of the revision, display on the GUI, a second lot revision box proximate to the displayed first lot revision box, wherein the displayed second lot revision box depicts the revision to the lot allocated for delivery, wherein the second lot revision box comprises a revised first pool box having a reduced size of the geometric shape of the first pool box which reduced size is proportional to a revised and reduced current face value of the first pool, and the second lot revision box further comprises a second pool box which has a size proportional to a current face value of a second pool of the lot, and wherein the current face value of the second pool is equal to an amount of the reduction of the current face value of the first pool.

17. The apparatus of claim 16, wherein the revision comprises a first revision; and wherein the instructions, when executed by the at least one processor, further direct the at least one processor to: receive an indication that a second revision to the delivery of the lot has occurred, the second revision being subsequent to the first revision; responsive to receiving the indication of the second revision, on the GUI a third lot revision box proximate to the second lot revision box, wherein the third lot revision box comprises a geometric shape that graphically depicts the second revision to the delivery of the lot, and wherein the third lot revision box comprises a third pool box that comprises a geometric shape positioned within the third lot revision box; and in connection with the displaying of the third lot revision box, make a visual change to the second lot revision box pool box that reflects the second revision.

18. An article of manufacture comprising a computer-readable medium that is non-transitory, in which the computer-readable medium stores instructions which, when executed by at least one processor, direct the at least one processor to:

receive an indication that a lot of securities is allocated to fulfill delivery of a transaction, wherein the lot of the securities is scheduled for delivery, wherein the lot comprises at least a first pool of the securities and a current face value;

responsive to receiving the indication, display on a graphical user interface (GUI) of a user device, a first lot revision box that comprises a geometric shape that graphically depicts information about the lot that is scheduled for delivery and the first pool, wherein the first lot revision box comprises a first pool box that conveys information about the first pool, and wherein a size of the first pool box is proportional to the current face value of the first pool relative to the current face value of the lot;

receive an indication that a revision to the lot allocated for delivery has occurred; and responsive to receiving the indication of the revision, display on the GUI, a second lot revision box proximate to the displayed first lot revision box, wherein the displayed second lot revision box depicts the revision to the lot allocated for delivery, wherein the second lot revision box comprises a revised first pool box having a reduced size of the geometric shape of the first pool box which reduced size is proportional to a revised and reduced current face value of the first pool, and the second lot revision box further comprises a second pool box which has a size proportional to a current face value of a second pool of the lot, and wherein the current face value of the second pool is equal to an amount of the reduction of the current face value of the first pool.

* * * * *